United States Patent
Buschmann

(10) Patent No.: US 11,440,105 B2
(45) Date of Patent: Sep. 13, 2022

(54) INNER CLAMPING MEANS COMPRISING A SECURED CLAMPING SEGMENT RING

(71) Applicant: HAINBUCH GMBH SPANNENDE TECHNIK, Marbach (DE)

(72) Inventor: Heiko Buschmann, Bietigheim-Bissingen (DE)

(73) Assignee: HAINBUCH GMBH SPANNENDE TECHNIK, Marbach (DE)

( * ) Notice: Subject to any disclaimer, the term of this patent is extended or adjusted under 35 U.S.C. 154(b) by 482 days.

(21) Appl. No.: 16/605,379

(22) PCT Filed: May 9, 2018

(86) PCT No.: PCT/EP2018/061993
§ 371 (c)(1),
(2) Date: Oct. 15, 2019

(87) PCT Pub. No.: WO2018/224237
PCT Pub. Date: Dec. 13, 2018

(65) Prior Publication Data
US 2021/0078083 A1 Mar. 18, 2021

(30) Foreign Application Priority Data
Jun. 7, 2017 (EP) .................................... 17174759

(51) Int. Cl.
*B23B 31/40* (2006.01)
(52) U.S. Cl.
CPC ..... *B23B 31/4033* (2013.01); *Y10T 279/1012* (2015.01)
(58) Field of Classification Search
CPC .............. B23B 31/207; B23B 31/4006; B23B 31/4013; B23B 31/4033; B23B 31/4066; Y10T 279/1012
See application file for complete search history.

(56) References Cited

U.S. PATENT DOCUMENTS

| | | | | |
|---|---|---|---|---|
| 2,447,682 A | * | 8/1948 | Bockman | B23B 31/404 279/2.15 |
| 2,890,055 A | * | 6/1959 | Garrison | B23B 31/4033 279/157 |

(Continued)

FOREIGN PATENT DOCUMENTS

| | | |
|---|---|---|
| CN | 1849189 A | 10/2006 |
| CN | 201969905 U | 9/2011 |

(Continued)

OTHER PUBLICATIONS

Chinese Office Action issued in corresponding Chinese Application No. 201880037944.2 dated Apr. 29, 2020 (7 pages).

(Continued)

*Primary Examiner* — Eric A. Gates
(74) *Attorney, Agent, or Firm* — Flynn Thiel, P.C.

(57) ABSTRACT

A clamping arrangement for fixing workpieces, having a housing with a clamping cone and a clamping segment ring with a plurality of clamping segments. The clamping segments are movable radially relative to one another via joint axial movement relative to the clamping cone. An ejector pin is provided for removal of the clamping segment ring from the clamping cone. A contact region for reception of or contact with a distal end of the ejector pin is provided on an end face of at least one of the clamping segments, which contact region is designed such that the ejector pin restricts outward mobility of the clamping segment in the radial direction in a positive locking manner when the distal end of the ejector pin is arranged in the contact region.

12 Claims, 3 Drawing Sheets

(56) References Cited

U.S. PATENT DOCUMENTS

| | | | | |
|---|---|---|---|---|
| 2,893,742 A | * | 7/1959 | Johann | ................ B23B 31/1175 |
| | | | | 279/2.04 |
| 2,970,842 A | * | 2/1961 | Drew | ................. B23B 31/4033 |
| | | | | 279/2.12 |
| 9,782,833 B2 | * | 10/2017 | Tan | .......................... B23Q 3/08 |
| 2008/0088073 A1 | | 4/2008 | Rosberg | |

FOREIGN PATENT DOCUMENTS

| | | | |
|---|---|---|---|
| CN | 103962598 A | | 8/2014 |
| CN | 106624008 A | | 5/2017 |
| CN | 108356305 A | * | 8/2018 |
| FR | 2297107 A1 | | 8/1976 |
| JP | 60131103 A | * | 7/1985 |
| WO | 2005025790 A1 | | 3/2005 |
| WO | 2005063426 A1 | | 7/2005 |

OTHER PUBLICATIONS

International Search Report issued in corresponding International Application No. PCT/EP2018/061993 with English translation dated Aug. 1, 2018 (5 pages).

Written Opinion of International Searching Authority issued in corresponding International Application No. PCT/EP2018/061993 dated Aug. 1, 2018 (5 pages).

Search Report of European Patent Office issued in corresponding European Application No. 17174759.5 with English translation of category of cited documents dated Nov. 15, 2017 (6 pages).

\* cited by examiner

INNER CLAMPING MEANS COMPRISING A SECURED CLAMPING SEGMENT RING

AREA OF APPLICATION AND PRIOR ART

The invention relates to a clamping means in the form of an inner clamping means for fixing workpieces, in particular for the purpose of rotary machining of said workpieces.

Such a clamping means of the type in question has clamping surfaces which can be moved relative to one another and which are provided on different clamping segments and, as a result, can be moved relative to one another in a radial expansion direction. Movement of a clamping segment ring surrounding the individual clamping segments along a conical surface leads to expansion of the clamping segment ring, with the result that the clamping surfaces provided on the outside of the clamping segments come into contact with, the clamping surfaces of the workpiece in a preferably cylindrical recess of the workpiece. In the clamped state, the workpiece can then be machined, this being especially machining of the workpiece in the rotating state.

The clamping segments, which are jointly part of the clamping segment ring, are usually connected to one another, in particular by connecting sections made from an elastic material, which are spaced apart in the circumferential direction.

The problem is that, in the case of material fatigue, especially in the region of said connecting sections, there is the risk that the clamping segment ring will fail under the effect of the centrifugal forces; the individual clamping segments will be released from the clamping means in an uncontrolled manner and at high speed. This risk exists especially when the clamping means is set in rotation before workpieces have been clamped by said clamping means, especially in the course of setup.

To prevent this, there is an already known practice of first of all mounting an encircling metallic ring on the housing-side clamping cone, said ring being in positive engagement with the individual clamping segments in respect of a radial direction, thus ensuring that, if the clamping segment ring fails, it effectively prevents the clamping segments from being flung away from the clamping means.

However, the disadvantage with this solution is the increased setup effort caused by the mounting of said ring. An even more significant factor is that the clamping cone must have a longer length to receive the additional ring; this, in turn, causes a higher degree of bending deformation during operation. The consequence is lower machining accuracy.

The problem addressed by the invention is that of developing a clamping means of the type in question in such a way that it offers effective securing of the clamping segment ring against individual clamping segments being flung out without the need to accept reduced machining accuracy.

A clamping means of this kind is in the form of an inner clamping means and is provided for fixing workpieces, in particular for the purpose of rotary machining of said workpieces.

The clamping means has a housing which is extended in the axial direction and which, for its part, has a clamping cone which tapers toward a distal end and is aligned in the axial direction.

The clamping means furthermore has a clamping segment ring comprising a plurality of clamping segments, which can be moved relative to one another in the radial direction. These clamping segments have, on the outside thereof, a clamping surface for contact with the workpiece and, on their inside thereof, an obliquely angled sliding surface for contact with the clamping cone. The clamping segments can be moved radially relative to one another by joint axial movement relative to the clamping cone. The clamping segment ring has at least two clamping segments. Configurations with more than two clamping segments, in particular with 3, 4 or 6 clamping segments, are preferred.

The clamping means has at least one ejector pin, which is received in an opening of the housing and can be moved in the axial direction relative to the housing so as to apply a force to the clamping segment ring for separation from the clamping cone.

A contact region for reception of or contact with a distal end of the ejector pin is provided on a proximal end face of at least one clamping segment. This contact region and the distal end of the ejector pin are designed in such a way that, when the distal end of the ejector pin is arranged in the contact region of the clamping segment, the ejector pin restricts outward mobility of the clamping segment in the radial direction in a positive-locking manner.

In a configuration according to the invention, it is thus envisaged that at least one clamping segment of the clamping segment ring and, as a particular preference, a plurality or all of the clamping segments of the clamping segment ring is/are secured in a positive-locking manner in respect of a radial direction by means of at least one ejector pin, the primary purpose of which is, by axial movement, to push the clamping segment ring down off the clamping cone against the self-locking effect for the purpose of removal. As a preferred option, a plurality of ejector pins is provided, these being provided for reception or contact in contact regions of a plurality of clamping segments. As a particular preference, each clamping segment is assigned at least one dedicated ejector pin.

For this purpose, the distal end of the at least one ejector pin and the proximal end face of the clamping segment ring, which faces in the direction of the ejector pins, are designed such that, in respect of a radial direction, they form an undercut such that separation of the clamping segment from the ejector pin taking effect directly in the radial direction is prevented.

Since, unlike the prior art cited at the outset, no intermediate segments with a lengthening effect in respect of the axial direction are provided between the ejector pins, on the one hand; the clamping segments, on the other, it is possible to achieve a relatively short overall length of the clamping cone, allowing high machining accuracy.

In a particularly simple configuration, the distal end of the ejector pin and the contact region on the clamping segment interact in a positive-locking manner only in the radial direction in order to effectively prevent the cited uncontrolled flinging out of a clamping segment.

In a preferred configuration, however, it is envisaged that the contact region on the at least one clamping segment and the distal end of the ejector pin are designed in such a way that, when the distal end of the ejector pin is arranged in the contact region, the ejector pin additionally restricts rotary mobility of the clamping segment in relation to the clamping cone in a positive-locking manner.

In this configuration, it is thus envisaged that the distal end of the ejector pin and the contact region bring about a positive engagement which not only restricts an outward radial movement of the clamping segments but also a rotary motion of the clamping segment ring relative to the clamping cone. On the one hand, this prevents the clamping segment ring from shifting rotationally relative to the clamping cone during operation. Moreover, the contact region or regions on the at least one clamping segment ring and the ejector pin or pins in such a manner of interaction, which is also positive rotationally, can also define one or more rotational positions at which the clamping segment ring can be pushed onto the clamping cone.

The contact region, in the region of which the distal end of the ejector pin interacts with the clamping segment in an at least radial securing action, should be designed such that the radial movement of the clamping segments relative to one another for the purpose of clamping and unclamping, as required for correct operation, remains possible. For this purpose, the distal end of the ejector pin and the contact region on the at least one clamping segment should allow limited radial play.

The at least one contact region on the clamping segment is preferably a recess introduced into the clamping segment. In the case of such a configuration, the radial play mentioned can be achieved by designing the recess in the form of a radially extended groove.

The configuration with a recess introduced into the clamping segment represents a very simple way of achieving the desired positive engagement. Instead of providing supplementary components on the at least one clamping segment to form the contact region, said recess is merely introduced into the end face of the clamping segment in the embodiment with a recess, wherein, at least on an inside of the clamping segment ring, this recess does not extend as far as the sliding surface arranged there but leaves untouched at least a land which brings about the positive engagement.

The recess is preferably of open design in the direction of the external clamping surface. On the outside, such an open configuration of the recess is uncritical as regards the functionality of securing in a radially positive-locking manner. Moreover, this open embodiment enables the distal end of the ejector pin to project radially outward from the recess here, depending on the radial expansion of the clamping segment ring. This makes it possible to choose ejector pins with a relatively large diameter, despite the fact that the clamping segments are relatively thin-walled in the radial direction.

In a preferred configuration, the clamping cone has a frustopyramidal shape having at least 3, preferably 6, clamping cone segments set at an angle to one another. Moreover, it is preferably provided that the insides of the clamping segments together form a polygonal shape with rectilinear edges in cross section, wherein the contact regions of the clamping segments are each in alignment in the radial direction with a central point of such an edge.

Even though it is also possible, in principle, for the invention to be used with rotationally symmetrical clamping cones, the use of a frustopyramidal clamping cone is nevertheless advantageous since, as a result, the thickness of the clamping segments in the radial direction is generally not constant in the circumferential direction. Since the outer surfaces of the clamping segment ring, which act as clamping surfaces, generally form an approximately circular or cylindrical surface, the hexagonal configuration of the internal cross section for the contact regions makes it possible to have recourse to thicker regions of the clamping segment, namely in alignment with said central points of the edges.

As a preferred option, at least one contact region for receiving the distal end of a respective ejector pin is provided on each of a plurality of clamping segments; the contact regions are arranged in such a way relative to one another that entry of the distal ends of the ejector pins is possible only in one rotational position of the clamping segment ring relative to the clamping cone.

With such a configuration, the ejector pins perform not only their principal function of pushing the clamping segment ring down off the clamping cone and their above-described additional function of securing the clamping segments in a radially positive-locking manner but also a third function, namely that of defining a single possible rotational position of the clamping segment ring relative to the clamping cone at which entry of all the ejector pins into the corresponding contact regions of the clamping segments is possible. In particular, this is achieved by virtue of the fact that the ejector pins, on the one hand; the contact regions, on the other hand, are each spaced apart by different amounts in the circumferential direction. In the case of a configuration with three ejector pins and three contact regions, they could be spaced apart in the circumferential direction by 70°, 122° and 168°, for example. The desired aim of just one possible rotational position for engagement is thereby achieved in an effective manner. A defined relative rotational position of this kind is advantageous for achieving the greatest possible reproducibility of machining between different workpieces.

Even though a clamping means according to the invention is preferably used in the case of rotary machining, the advantage of the rotational position defined by ejector pins for the mounting of the clamping segment ring is also available when the clamping means does not rotate and is used in the context of non-rotary machining.

To apply force to the clamping segments, a tie bolt can be provided, which is guided in a tie bolt channel passing through the clamping cone in the axial direction and which has a contact pressure surface for applying force to the clamping segments in the proximal direction.

Here, provision is preferably made for the tie bolt and a distal end face of the clamping segment ring to be designed to jointly secure the clamping segment in a radially positive-locking manner. In this configuration, it is thus envisaged that the central tie bolts and the at least one eccentrically arranged ejector pin are coupled to one another axially and thus, after the tie bolt has been attached with the clamping segment ring already mounted, are always moved jointly in the axial direction.

BRIEF DESCRIPTION OF THE DRAWINGS

Further advantages and aspects of the invention will emerge from the claims and the following description of preferred embodiment examples of the invention, which are explained below with reference to the figures.

DETAILED DESCRIPTION

Figure 1:
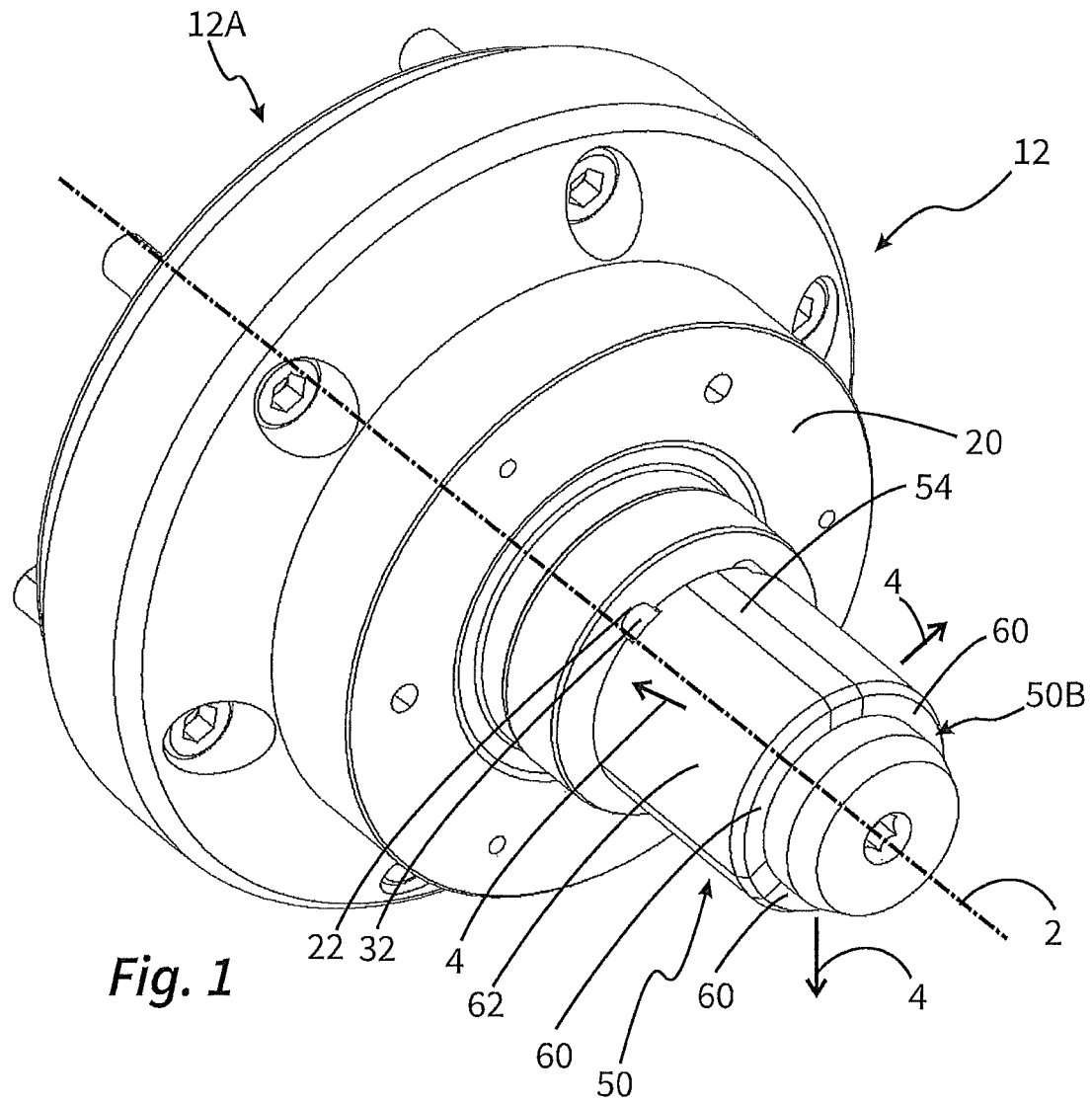
FIG. 1 shows a clamping means according to the invention in a perspective illustration with the clamping segment ring attached.

FIG. 1 shows an illustrative embodiment example of a clamping means 12 according to the invention in a perspective illustration. The clamping means 12 is provided for attachment, by means of its proximal end face 12A, to a workpiece spindle (not illustrated in the figures) of a machine tool. During machining, the clamping means 12 with all the parts illustrated in the figures thus rotates around the axial direction axis indicated by reference sign 2.

At the distal end of the clamping means 12, a clamping segment ring 50 that is interchangeable, as required for correct operation, is provided, having a total of three clamping segments 60, which are connected to one another by elastically deformable connecting elements 54. The three clamping segments 60 can thus be moved relative to one another in the radial direction 4. Provided on the outside of the clamping segments 60 are clamping surfaces 62, which come into contact with a cylindrical inner surface of a workpiece owing to the expansion mentioned, which will be explained in greater detail below; can therefore firmly hold said workpiece. In a manner which will be explained in greater detail below, the clamping segments 60 are secured against separation from the housing 20 in the radial direction 4, namely at the distal end face 50B, by means of a tie bolt 34 and are secured at the opposite, proximal end by means of ejector pins 32, as will be explained below.

Figure 2:
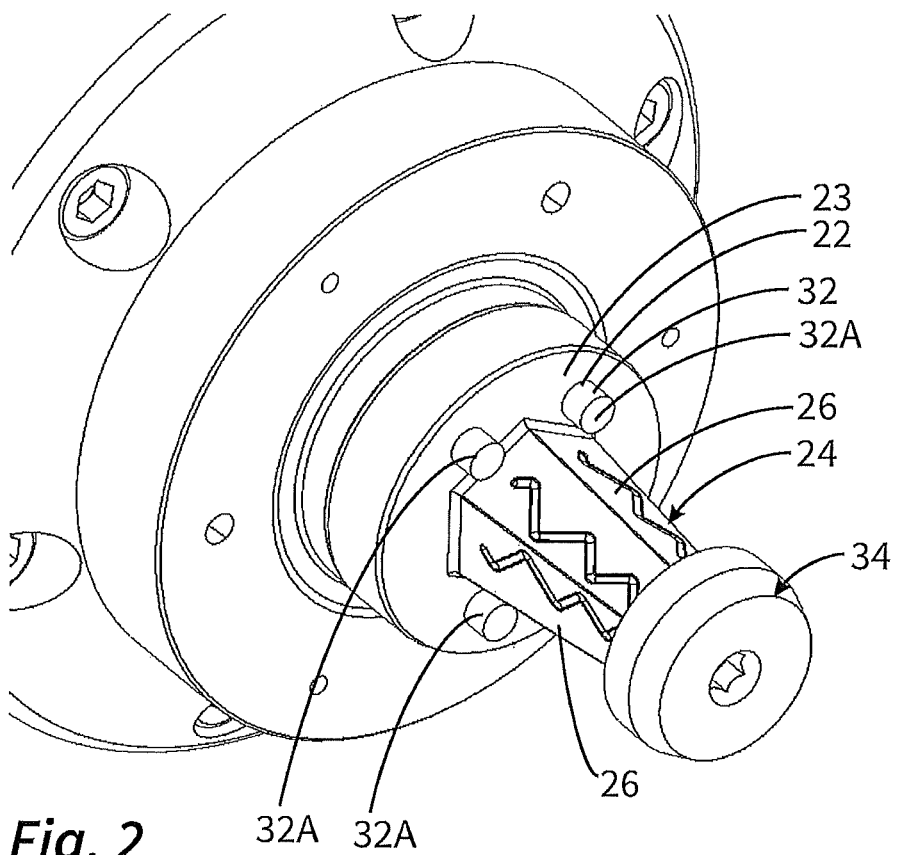
FIG. 2 shows the clamping means of FIG. 1 with the clamping segment ring removed.
Figure 3:
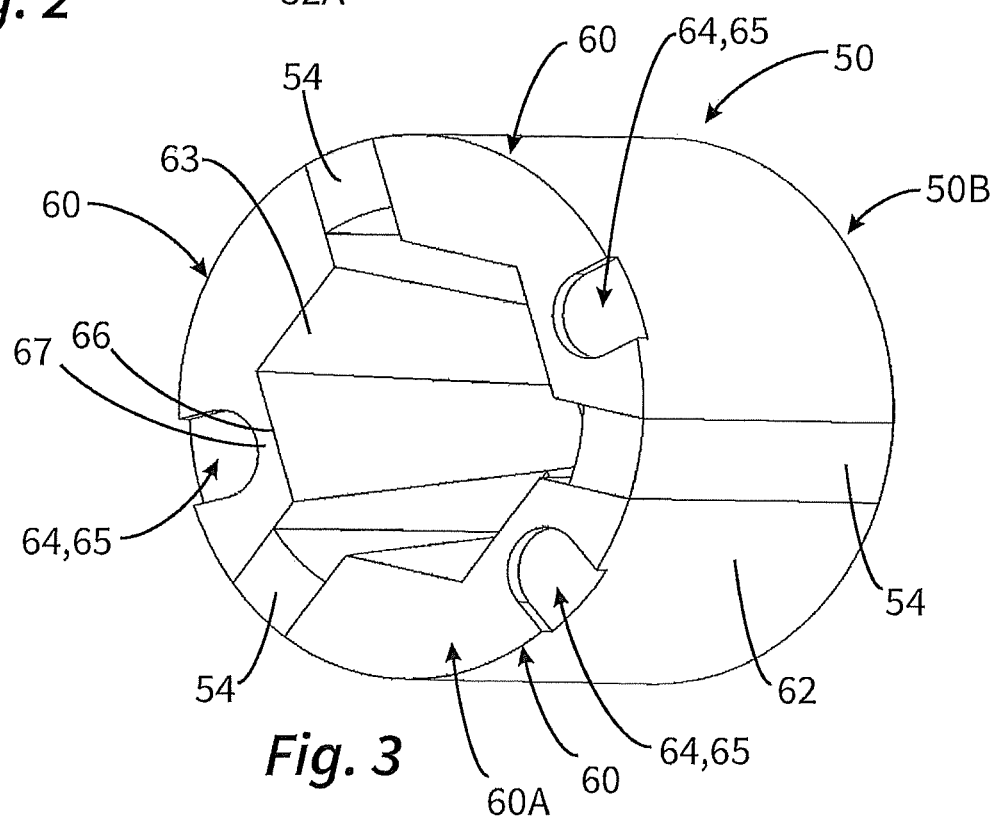
FIGS. 3 and 4 show the clamping segment ring illustrated separately from two different perspectives.

For an explanation of this, attention is drawn to FIGS. 2 and 3.

FIG. 2 shows the clamping means 12 of FIG. 1 with the clamping segment ring 50 removed. It can be seen that the clamping segment ring 50, which is omitted here, surrounds a clamping cone 24 designed as a hexagonal frustopyramid, the clamping cone segments 26 of which are positioned obliquely such that the clamping cone 24 tapers in the direction of its distal end. At the proximal end of the clamping cone 24, said cone is surrounded by a bearing surface 23, in the region of which three openings 22 are provided, into which three ejector pins 32 are inserted, such that they rise above the bearing surface 23 during operation. As may already be surmised from FIG. 2, the ejector pins 32 are not arranged equidistantly with respect to one another in the circumferential direction but enclose angles of 168°, 122° and 70°.

FIG. 3 shows the proximal end face 60A of the three clamping segments 60. It can be seen that sliding surfaces 63, which, just like the clamping cone segments 26, are positioned obliquely, are provided on an inside of the clamping segments 60 to correspond to the hexagonal frustopyramid of the clamping cone 24. This ensures that an axial movement of the clamping segment ring 50 of FIG. 3 in the proximal direction onto the clamping cone 24 of FIG. 2 allows a radial expansion of the clamping segment ring 50 and thus an enlargement of the spacing of the clamping surfaces 62 for the purpose of clamping.

Also visible in FIG. 3 are the three contact regions 64, which, in accordance with their purpose, interact with the distal ends 32A of the ejector pins 32. In the embodiment described here, these contact regions 64 are formed by milled pocket-like recesses 65, which are open toward the clamping surfaces 62 but are separated from the inner region of the clamping segment ring 50 by lands 67. These lands 67 bring about the intended radial positive engagement required for correct operation.

Insofar as the distal ends 32A are arranged in the recesses 65, there is no longer a risk of individual clamping segments 60 being flung out in a purely radial direction. Here, the recesses 65 are sufficiently large to permit a limited radial relative movement despite the radial movement of the clamping segments 60 in relation to the ejector pins 32 in accordance with the intended purpose of said segments.

Figure 4:
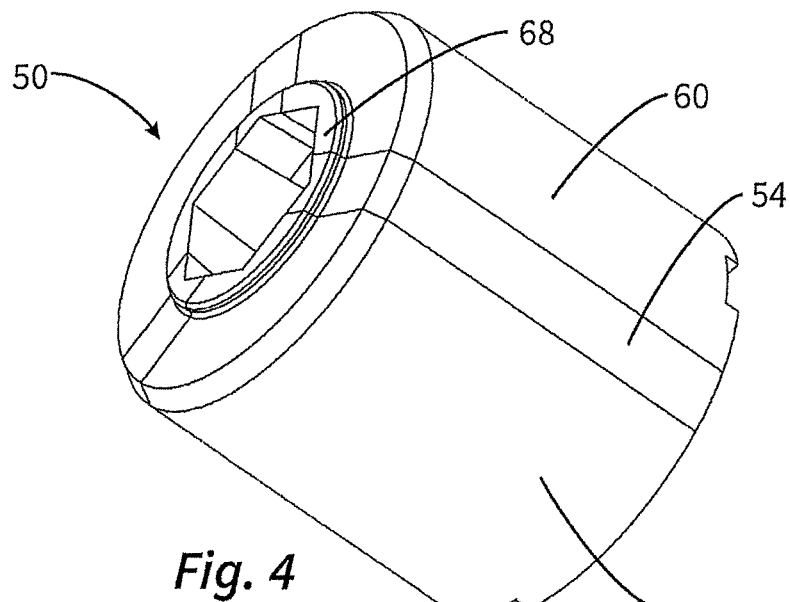

FIG. 4 shows the clamping segment ring 50 from the distal end face 50B thereof. Here, it can be seen that the clamping segments 60 on this side have a land 68, the significance of which is explained below.

Figure 5:
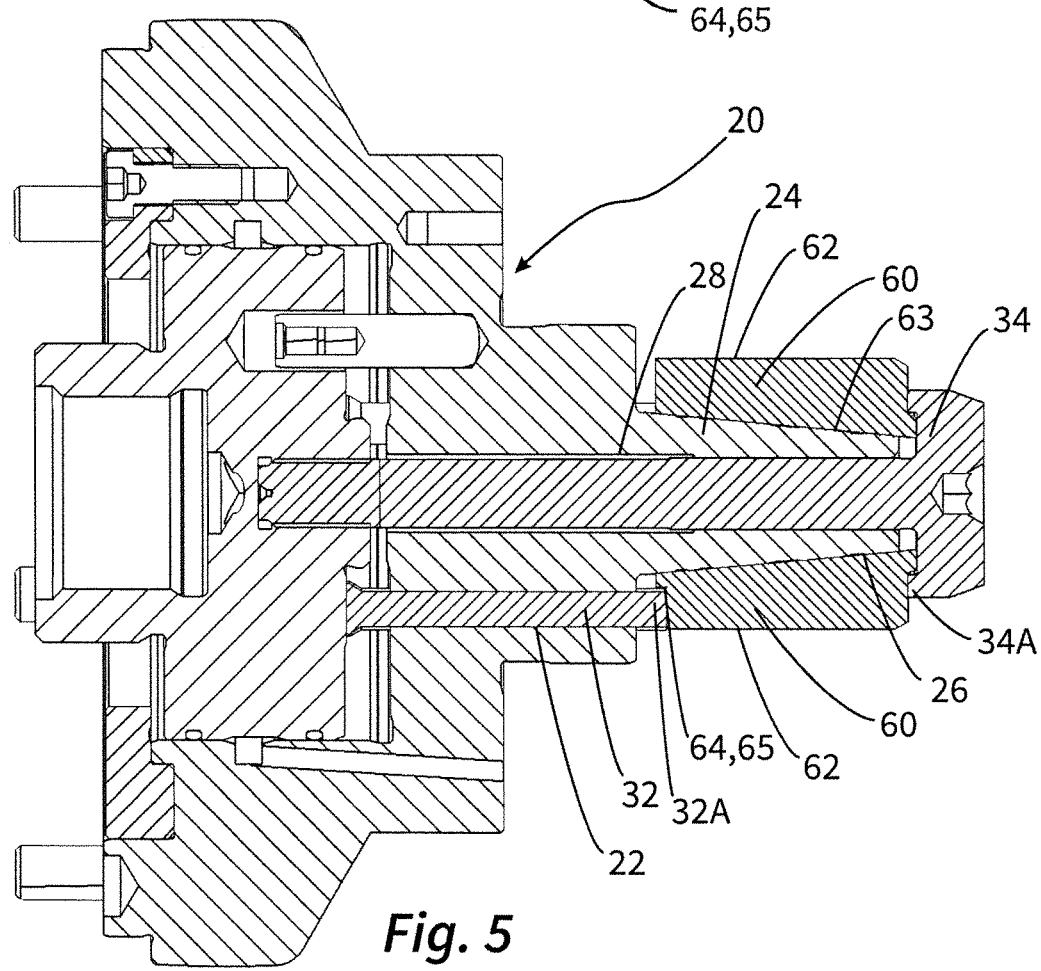
FIG. 5 shows the clamping means according to the invention in a sectioned illustration.

The engagement of the distal ends 32A of the ejector pins 32 in the recesses 65 is readily apparent from FIG. 5. It is likewise readily apparent from FIG. 4 that positive engagement is also established at the distal end face 50B of the clamping segment ring 50 by said lands 68, namely by an encircling land 34A, which is provided on the tie bolt 34 and which fits over the corresponding lands 68 on the at least one clamping segments 60 to form a radial positive engagement.

The configuration according to the invention is extremely simple structurally since the provision of ejector pins is already common practice. Merely by virtue of the contact regions 64 or recesses 65 and the special arrangement thereof in the manner illustrated by FIG. 3, effective protection against flinging out and an effective orientation aid are made available.

The invention claimed is:

1. A clamping means in the form of an inner clamping means for fixing workpieces, having the following features:
the clamping means has a housing extending in an axial direction;
the housing has a clamping cone tapering toward a distal end thereof and the clamping cone is aligned in the axial direction;
the clamping means has a clamping segment ring comprising a plurality of clamping segments, the clamping segments being movable relative to one another in a radial direction;
the clamping segments have, on an outside thereof, a clamping surface for contact with the workpiece;
the clamping segments have, on an inside thereof, an obliquely angled sliding surface for contact with the clamping cone, thus enabling the clamping segments to be moved radially relative to one another by joint axial movement relative to the clamping cone;
the clamping means has at least one ejector pin received in an opening of the housing and being movable in the axial direction relative to the housing so as to apply a force to the clamping segment ring for separation from the clamping cone;
a contact region for reception of or contact with a distal end of the ejector pin is provided on a proximal end face of at least one of the clamping segments;
the contact region and the distal end of the ejector pin are designed such that, when the distal end of the ejector pin is arranged in the contact region, the ejector pin restricts outward mobility of the at least one clamping segment in the radial direction in a positive-locking manner.

2. The clamping means as claimed in claim 1, further including a plurality of ejector pins for reception or contact in contact regions of at least some of the plurality of clamping segments.

3. The clamping means as claimed in claim 1, wherein each of the clamping segments is assigned at least one dedicated ejector pin.

4. The clamping means as claimed in claim 1, wherein the the contact region on the at least one clamping segment and the distal end of the ejector pin are designed such that, when the distal end of the ejector pin is arranged in the contact region, the ejector pin restricts rotary mobility of the at least one clamping segment in relation to the clamping cone in a positive-locking manner.

5. The clamping means as claimed in claim 4, wherein the contact region on the at least one clamping segment comprises a recess in the at least one clamping segment.

6. The clamping means as claimed in claim 5, wherein the recess is of open design in the direction of the clamping surface of the at least one clamping segment.

7. The clamping means as claimed in claim 1, wherein the clamping cone has a frustopyramidal shape having at least three clamping cone segments set at an angle to one another the insides of the clamping segments together form a polygonal shape with rectilinear edges in cross-section, wherein the contact regions of the clamping segments are each in alignment in the radial direction with a central point of one of the edges.

8. The clamping means as claimed in claim 7, wherein the clamping cone has six clamping cone segments.

9. The clamping means as claimed in claim 1, further including a plurality of the contact regions and a plurality of the ejector pins, at least one of the contact regions for receiving the distal end of a respective one of the ejector pins is provided on each of the clamping segments, and the contact regions are arranged relative to one another such that entry of the distal ends of the ejector pins is possible only in one rotational position of the clamping segment ring relative to the clamping cone.

10. The clamping means as claimed in claim 1, wherein in order to apply force to the clamping segments, a tie bolt is provided, the tie bolt guided in a tie bolt channel passing through the clamping cone in the axial direction, the tie bolt having a contact pressure surface for applying force to the clamping segments in a proximal direction.

11. The clamping means as claimed in claim 10, wherein the tie bolt and a distal end face of the clamping segment ring are designed to jointly secure the clamping segments in a radially positive-locking manner.

12. The clamping means as claimed in claim 1, wherein:
the clamping segment ring has a total of two, three, four or six clamping segments; and/or
the clamping means has an axially movable tension means, a tie bolt and the at least one ejector pin being are attached to the tension means so as to be fixed in the axial direction; and/or
the clamping segment ring has elastic connecting elements between the clamping segments; and/or
the clamping cone has the shape of a rotationally symmetrical frustoconic.

* * * * *